UNITED STATES PATENT OFFICE.

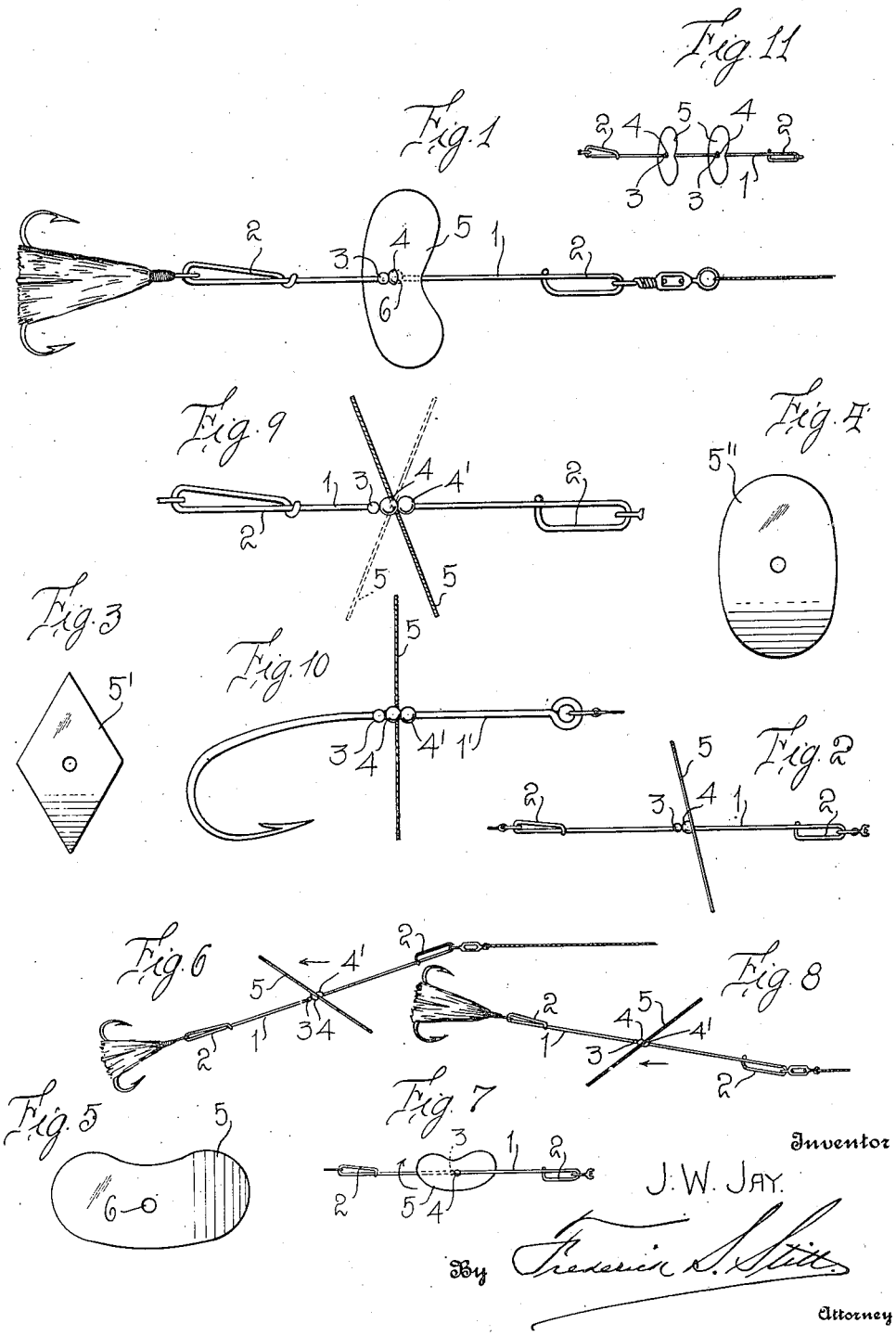

JAMES WILLIAM JAY, OF BALTIMORE, MARYLAND.

WIGGLING FISH-LURE.

1,297,354.　　　　　Specification of Letters Patent.　　Patented Mar. 18, 1919.

Application filed March 19, 1917. Serial No. 155,800.

*To all whom it may concern:*

Be it known that I, JAMES WILLIAM JAY, a citizen of the United States, residing at Baltimore, in the State of Maryland, have invented certain new and useful Improvements in Wiggling Fish-Lures, of which the following is a specification.

This invention comprehends certain new and useful improvements in lures for fish, and the invention has for its primary object to provide means whereby a fishhook or the like, when drawn through the water, will have a wiggling and erratic motion imparted thereto that will simulate the movements of an animate object such as a fly or other live lure, thereby attracting the fish.

At the outset of the specification, I deem it advisable to state that my present invention must not be confused with a spinner or spoon or other revoluble types of lures, for it is essentially different therefrom; my invention aims to provide, in an artificial bait, a deflector which will cause the bait to move erratically up and down and from side to side when drawn through the water by the line, whereby the deflector, hereinafter more specifically described, will not only reflect or "flash" the light as a spinner reflects the light, but will cause the hook to wiggle and dart as it moves along, this being the primary function of the device and primary object of the invention.

With these and other objects in view, as will more fully appear as the description proceeds, the invention consists in certain constructions, arrangements and combinations of the parts that I shall hereinafter fully describe and claim.

For a full understanding of the invention, reference is to be had to the following description and accompanying drawing, in which—

Figure 1 is a side elevation of one embodiment of my invention, the deflector being shown in tilted position relative to the shank.

Fig. 2 is a side elevation showing the deflector in edge view.

Figs. 3, 4 and 5 are detail views of some of the different forms of the deflectors that may be employed.

Figs. 6, 7 and 8 are views in the nature of diagrams hereinafter specifically referred to.

Fig. 9 is a view of another embodiment of the device.

Fig. 10 is a view of still another embodiment, and

Fig. 11 is a view of a modification showing two deflectors upon the same shank.

Corresponding and like parts are referred to in the following description and designated in all of the views of the accompanying drawing by like reference characters.

Referring to the drawing, and now more particularly to Figs. 1 and 2, the numeral 1 designates a link formed with the ordinary loops or eyes 2 at each end for the attachment thereto of any type of hook or hooks, and any type of swivel, although, of course, instead of a swivel being employed, the line may be attached to the link direct. In carrying out my invention, the shank 1 is provided at any desired point in the length thereof with a stop or shoulder 3 which may be formed in any desired way as, for example, by means of a drop of solder or the like, and I insert upon the shank 1 so as to lie against the stop or shoulder 3, a convex and preferably substantially spherical bearing member 4 which is formed by a glass or other bead whereby it may be readily slipped upon the shank, although it is to be understood that the invention is not limited in this regard, as any convex or substantially spherical bearing member may be employed. In completing that form or embodiment of my invention now being described, I slip upon the shank 1 a substantially flat plate or disk 5 constituting a deflector, said disk being of any desired marginal outline or form, and being provided with an aperture 6 extending therethrough, said aperture, it is to be particularly noted and borne in mind, being preferably circular in formation and of a size appreciably larger than the diameter or thickness of the shank 1, but smaller than the convex or substantially spherical bearing member 4 so that in the assembled relation of the parts, a substantial portion of the bearing member 4 will protrude through the aperture 6, as will be hereinafter more specifically referred to. Preferably, the aperture 6 is formed in the plate or disk 5 at such a point that all portions of the plate or disk will be disposed in symmetrical relation to the aperture. To show what is meant by this, and to further show that the invention is not limited to any particular marginal outline or shape of the plate or disk 5, reference is to be had to Figs. 3, 4 and 5, wherein are illustrated plates or disks of different forms, the plate or disk 5', shown in Fig. 3 being many sided and of diamond shape; the disk 5'' illustrated in Fig. 4 being oval or of elliptical shape, and the disk 5 illustrated in Fig. 5 being what I might term a distorted kidney shape and being the same form as illustrated in Fig. 1.

From as much of the description as has preceded in connection with the correlated views of the accompanying drawing, I wish to point out that in the construction of my improved device, when the hook is drawn through the water, in the direction of the dart in Figs. 1 and 2, the plate or disk 5, which has a very unstable bearing upon and against the member 4 will be titled manifestly as for example, in the direction of the dart shown in Fig. 6, and as it is thus tilted upon the member 4, the action of the water against the rearwardly deflected blade or vane of said plate will cause the hook to instantly swerve in a lateral direction. But this swerving action will not be constant or continue for any length of time, owing to the fact that the plate 5 is free to turn on the bearing member 4 as well as to tilt or rock thereon, and as it turns, the angle of deflection will be immediately shifted, and shifted again and again so that the shank will move with a succession of jerks or wabbling movements, as illustrated diagrammatically in Figs. 6, 7 and 8, and thereby produce the wiggling or darting action which is the object of this invention.

I deem it necessary to lay particular stress upon the instability of the bearing against which the deflector lies, for I believe that it is this instability which is of prime importance in securing the wiggling or darting movement. By providing this unstable bearing, the deflector will remain in one plane only for a very short time, and will change its position almost constantly or intermittently, both as regards its movements in a rotary direction about the bearing, and as regards the angle or angles relative to the shank, and thus it is that the darting action is imparted to the lure.

Now, it is to be particularly noted that I have found by repeated experiments and demonstrations that the plate or disk 5 must be either flat, as illustrated in the accompanying drawing, and have its two blades or wings 7 lying in exactly the same plane, or if bent or curved at all, must be curved only toward or in the direction that the hook or other bait constructed in accordance with this invention, is drawn through the water. It must distinctly not be bent in the opposite direction, and said blades or wings must be entirely devoid of pitch or transverse inclination. In other words, I have found by repeated experiments that it will entirely defeat the object of my invention to give any transverse pitch to the blades or wings so as to make them like the blades of the ordinary propeller, hence at this point I disclaim the construction disclosed by the Junod Patents No. 613,519, dated November 1, 1898, and No. 747,976, dated November 29, 1903. In my device, although the plate or disk is free to turn upon the shank and upon the substantially spherical bearing member against which it abuts, there is no uniform and continuous rotary movement such as would be produced by having a pitch to the blades or wings, but only a combined rocking and intermittent partial rotary movement which does not cause the plate or disk to spin, but to possess a movement which is a combination of tilting movement and the said intermittent partial rotary movement, whereby the bait will be caused to dart from side to side and up and down. In this respect, I consider my invention to clearly distinguish from the devices of the Junod patents hereinbefore referred to and specifically disclaimed.

While, as above stated, the blades or wings of the deflector must be entirely devoid of transverse pitch, yet it is within the scope of my invention to slightly bend the blades or wings in a direction toward the draft member or line, and by doing this, I have found that the bending increases the eccentricity of movement. However, care must be taken not to bend the blades or wings too much in the direction of the draft member or line, for if the wings or blades are bent too much in this direction, I have found that the water will act upon the rear face of one of the blades and thereby cause the blade to hug the shank at the extreme angular relation of the deflector with the shank, and thus prevent any tilting and intermittent partial rotary movement of the deflector such as is necessary to cause the lure to wiggle or dart.

While a single bead or bearing member 4 will suffice, in connection with its correlated or concomitant parts hereinbefore described, to produce the desired result, yet I prefer to use in connection therewith an auxiliary bearing member, designated 4' and shown in Figs. 9 and 10. This auxiliary bearing member lies on the opposite side of the plate or disk 5 from the main bearing member 4, or in other words, the plate or disk lies between the main and auxiliary bearing members, and the function or purpose of the auxiliary bearing member is to prevent the plate or disk from tilting so far that the water will act against the relatively rear face thereof, for if that were permitted to happen, manifestly the plate would hug the shank 1 at one limit of this oblique movement, and remain stationary and thereby defeat the object of the invention, the essence of which is the freedom of movement of said plate or disk to continually possess the capability of the combined tilting and partial intermittent rotary movement and to continue to maintain the function of instability upon the bearing member, as hereinbefore referred to.

It is to be understood that my invention is not limited in any way to the use of any particular shank. It may be the link 1 as hereinbefore mentioned, or the shank 1' of an ordinary hook such as shown in Fig. 10, the invention not being limited in this regard in any way.

It is also to be understood that my invention is not limited to the use of only one deflector. For example, as illustrated in Fig. 11, two deflectors may be employed, care being taken so that the deflectors are maintained in sufficiently spaced relation to each other to allow the same water, after it acts on one of the deflectors, to act with equal force and effect upon the other one, for I have found that when two deflectors are employed, if they are allowed to come too close together, the forward one will suck the other up against it and defeat the object of the rearmost deflector.

It is to be noted that the bead or convex bearing 4 is freely rotatable upon the shank 1 or 1' and that the deflector 5 has a central aperture which, relatively speaking, is considerably larger than the shank. Now if this deflector was mounted directly upon the shank and had such a relatively large opening, the deflector would turn upon the pressure of water immediately into a very acute angle with the shank and into such an angle that it would only act slightly to deflect the shank and hook and the same thing would occur if the blades are so bent with relation to each other, that is, if the angle of the blades with relation to each other were so great that when one of the blades was disposed nearly at a right angle to the shank, the other blade was disposed at an extremely acute angle with the shank. In order to provide for a support for the deflector and yet at the same time prevent the deflector binding so tightly on the shank as to prevent its free rotation, I have provided the globular or convex bead or bearing 4, but I have mounted this bead or bearing loosely upon the shank so that it may rotate therewith. Now the aperture through the deflector is less than the greatest diameter of the bearing 4 but considerably greater than the diameter of the shank. Now when the pressure of the water comes upon the deflector by reason of its being drawn through the water, the deflector is forced back in close engagement with the globular bearing 4, so that the bearing 4 is forced out through the aperture. As a consequence, the wall of the aperture in the deflector bears tightly against the bearing 4. The deflector is unstable, however, and the pressure of water tends to cause the deflector to move into an angular relation to the longitudinal axis of the shank and the deflector therefore shifts upon the globular bearing 4, so that one edge of the aperture rides up on the bearing while the other edge of the aperture rides down on the bearing until it strikes the shank.

When this occurs, the deflector is held or bound from any further movement in the plane of the shank and then pressure of the water on the inclined face of the deflector acts to shift the shank laterally until a point is reached when the deflector is nearly parallel to the direction of pressure of the water, when the pressure on the deflector becomes so greatly lessened that the deflector may turn in a plane transverse to the shank. When this occurs, it will be obvious that the deflector will shift the shank and hook in another direction to that in which they were first shifted and the shank and hook will be given a darting movement, as previously described.

With these facts in mind, it is obvious that it is necessary in order for my bait to function properly, that the deflector shall not move to a position where either of its blades is at an extremely acute angle to the shank, that the deflector shall be capable of free rotation upon the shank transverse thereto, and that the deflector shall be capable of occupying a position eccentric to the shaft, both longitudinally and laterally.

While the accompanying drawing illustrates what I believe to be the preferred embodiment of my invention, it is to be understood that the invention is not limited thereto but that various changes may be made in the construction, arrangements and proportions of the parts without departing from the scope of the invention as claimed.

What is claimed is:

1. A device of the character described including a shank and a deflector mounted thereon having pitchless blades, the deflector having a relatively large aperture through which the shank passes, the aperture being of such size relative to the shank as to permit the deflector to take an eccentric position relative to the shank and permit the deflector to rock upon the shank in the plane of the length thereof, the wall of the aperture preventing the angular movement of shank to a position wherein the blades are disposed at a very acute angle to the shank.

2. A device of the character described including a shank, a substantially flat deflector mounted thereon and having pitchless blades disposed in the same plane, the deflector having an aperture through which the shank passes, the aperture being sufficiently large relative to the shank as to permit the deflector to move into a position of eccentricity relative to the shank and into an angular relation thereon, and means for preventing the angular movement of the deflector to a position wherein the deflector is disposed at a very acute angle with the shank.

3. A device of the character described comprising a shank provided with a stop, a convex bearing member loosely mounted on the shank and adapted to abut against said stop, and a flat deflector having an aperture through which the shank passes and by which it is loosely mounted on the shank against said bearing member, the deflector being provided with pitchless blades, the aperture of the deflector being of greater size than the shank and of less size than said bearing member, whereby the deflector will have a combined rocking and rotary movement on the bearing member, the wall of the aperture being adapted to bind upon the shank and the bearing member and thereby prevent movement of the deflector into an angular relation less than 45° relative to the shank.

4. A device of the character described, comprising a shank, a convex bearing member mounted on said shank, and a deflector formed with an aperture by which it is adapted to be slipped upon said shank against said bearing member, and the deflector being substantially flat and provided with pitchless blades disposed in the same plane, the aperture of the deflector being of perceptibly greater size than the shank and of less size than the said bearing member.

5. A device of the character described, comprising a shank, a substantially spherical main bearing member loosely mounted on said shank, a substantially flat deflector formed with an aperture by which it is loosely mounted on said shank against said bearing member and provided with pitchless blades disposed in substantially the same plane, the aperture of the deflector being of perceptibly greater diameter than the shank and of less diameter than said bearing member, and an auxiliary bearing member loosely mounted on the shank against the deflector and on the opposite side of the latter from the main bearing member.

6. A device of the character described comprising a shank and a deflector embodying two connected blades and having an aperture large relative to the shank and through which the shank passes whereby the deflector may have a movement of rotation around the shank transverse thereto and a rocking movement in planes parallel to the length of the shank, there being means for limiting the last named movement of the deflector to prevent the deflector from taking a position with either one of its blades at a very acute angle to the shank.

In testimony whereof I affix my signature in the presence of two witnesses.

JAMES WILLIAM JAY.

Witnesses:
HENRY T. CROCKER,
EDGAR H. CROMWELL.